United States Patent Office 3,156,569
Patented Nov. 10, 1964

3,156,569
SEASONING COMPOSITION AND METHOD OF ENHANCING THE FLAVOR OF FOODS CONTAINING A GLUTAMIC ACID SALT
Joan M. Griffin, Forest Hills, and Edward F. Bouchard, Huntington, N.Y., and Kurt S. Konigsbacher, Stamford, Conn., assignors to Chas. Pfizer & Co., Inc., New York, N.Y., a corporation of Delaware
No Drawing. Filed Feb. 1, 1962, Ser. No. 170,494
13 Claims. (Cl. 99—140)

This invention relates to enhancing the flavor of foods. More particularly, it is concerned with new and novel seasoning compositions, with food products containing said novel compositions and with improved methods for enhancing the flavor and aroma of food products.

It is a matter of common knowledge and experience that the addition of monosodium glutamate and other commercially available glutamic acid salts such as, for example, monopotassium glutamate and monocalcium diglutamate, and the like, to many foods improves the flavor thereof to such an extent that wide consumer acceptance of the practice has been obtained. This appreciation of improved flavor is reflected in increased sales volume of food so treated. Furthermore, numerous taste panel tests demonstrate that many foods containing monosodium glutamate and its related salts are preferred over those from which it is omitted. This acceptance has been found for glutamate-treated meats, poultry, fish and shellfish, vegetables, soups, soup mixes, certain types of cheese spreads, breading mixes, sauces and salad dressings. In addition to their effect on fresh foods, said glutamates heighten the gustatory appeal of canned or frozen foods as well as of meats cured by pickling and smoking.

It has now been surprisingly found that an unexpected increase in flavor and odor enhancement and appreciation is obtained if controlled amounts of maltol (3-hydroxy-2-methyl-4-pyrone) are used with glutamates to season foods. This unexpected enhancement in characteristic and desirable odor and flavor is particularly pronounced in soups, meats, fish and vegetables. Furthermore, these valuable manifestations arise only when the unique combinations of the instant invention are employed and are not observed when glutamates or maltol are used independently.

Maltol as a chemical entity is a white crystalline material with a sweet odor and characteristic taste. This combination of properties has been made use of in the past by adding maltol to such foods as cakes, candies, chocolate fillings, desserts, cookies, beverages and fruit salads, juices and wines. The effect of such additions has been to increase the impression of sweetness already present in the food while providing a gain in the "body" of the flavor.

Monosodium glutamate as a chemical entity is a white, crystalline material with a characteristic sweet-saline taste and no odor. Monosodium glutamate and the other said glutamates have the specific properties of increasing salivary secretion, imparting a sensation of increased succulence to food and contributing to the persistence of the taste sensation. These effects are most marked when the glutamates are added to foods such as soups, meats, fish and vegetables.

As will be exemplified in detail hereinafter, the unusual enhancement of aroma and flavor of foods obtained by application of this invention is observed following the use of seasoning mixtures containing said glutamates and maltol, wherein the maltol is present in said mixture in an amount of from about 0.5 to about 20 percent by weight based on the glutamate. In addition, the effective levels of usage of such seasoning mixtures as contemplated by the present invention are found to range from about 0.05 to about 1.0 percent by weight of the prepared food.

It is to be understood that the present invention is not limited to the single embodiment of mixtures of glutamates and maltol but contemplates moreover the further embodiments comprising processes involving, and products made by, the addition of these two materials to food as a single substance and in any order of addition. Furthermore, it is to be understood that this invention can be advantageously used in combination with many other seasonings ordinarily used in the preparation of food. Among said seasonings are salt, pepper, cloves, cinnamon, nutmeg, and the like.

A particularly desirable embodiment of the instant invention is the use of a combination of maltol, a glutamate and inosinic acid or the sodium, potassium and calcium salts thereof. Thus, as will be exemplified hereinafter, a combination of maltol, monosodium glutamate and inosinate salts has been found to be particularly effective in increasing the appeal of beef-containing foods. The inosinic acid or salt thereof may be employed in amounts equivalent to up to about 20 percent by weight of the glutamate. However, for most purposes it is preferred to use inosinic acid at levels of from about 6 to about 12 percent by weight of the glutamate.

It is accordingly among the objects of the present invention to provide seasoning compositions with improved flavor enhancing effects when used in foods. A further object is to provide food preparations with much enhanced flavor and aroma and therefore wider acceptability. A further object is to provide improved methods for the enhancement of flavor and aroma of prepared foods.

These and other objects are achieved by application of the process of this invention which in essence comprises enhancing the flavor and aroma of prepared food by incorporating therein an amount of up to about 1 percent by weight of a glutamic acid salt and maltol, said maltol being present in the amount of from about 0.5 to about 20 percent by weight of said glutamic acid salt.

The glutamic acid salt employed can have as its cation component any of the species which are acceptable for use in the flavor enhancement art. Particularly preferred for the practice of this invention are the cations, sodium, potassium and calcium. Potassium and calcium are used in cases where dietary needs require low sodium intake.

The total amount of seasoning mixtures to be used will be determined by the nature of the food to be so-treated. The native flavor of the food is one important factor. Highly-spiced or strongly-flavored foods usually require less of the composition than blander foods. Another factor in the level to be used is the subjective taste sensitivity of the consumer. However, with certain exceptions for rare individual tastes, the preferred concentrations set out hereinafter are subjectively approved by the great majority of consumers. Accordingly, while the composition can be employed in the range from about 0.05 to about 1 percent by weight it is usually preferable to use amounts ranging from about 0.1 to about 0.3 percent by weight in normally salted food.

In terms of the preferences of subjects in taste and aroma test panels, the amount of maltol to be used with glutamate salts is critical to the present invention. If the amount of maltol is increased to above about 20 percent by weight of the glutamate salt, it is found that an unpleasant "burning" sensation may be noticed when tasting foods containing normally effective amounts, that is, between about 0.05 and 1 percent of total seasoning. If, on the other hand, the amount of maltol in the compositions is decreased to below about 0.5 percent by weight of the glutamate salt and foods are prepared containing the aforesaid normally effective amounts of seasoning, it is found that the unusual flavor enhancement which is one of the objects of this invention cannot be detected by normal subjects. The amount of maltol to be used with glutamates within these aforesaid limits of about 0.5 to about 20 percent by weight of the glutamate is determined by the nature of the food to be treated. It is found, for example, that a preferred level of maltol to be used with glutamates to flavor beef bouillon is about 8 percent by weight, to flavor clam chowder a preferred level is about 8 to about 19 percent by weight, to flavor a vegetable cream soup a preferred level is about 6 to about 10 percent by weight, to flavor spaghetti with meatballs a preferred level is about 8 percent by weight and to flavor chicken pies a preferred level is about 10 percent by weight of the glutamate.

The method of adding the seasonings to food is not critical to the invention. Addition of the compositions is easily accomplished in most food processing operations. They can be added in a separate step, but in many operations it is preferred as a manner of convenience to add them in conjunction with spices, sugar or salt, either in a dry mix or in solution. This method is particularly applicable for the preparation of canned soups, stews, sauces, chili and batch-type canned or precooked frozen food products. For cured, primal cuts of meat, the mixtures can be added to the pumping pickle after first dissolving it in water.

In the preparations of vegtables for freezing, the novel seasoning compositions of the instant invention can be added just after blanching either in powder forms or in solution. If the seasonings are added as powders, it is preferred to allow a few minutes to elapse before the packages are placed in the freezer. In canning vegetables, the composition is added just before filling. Among the vegetables for which the flavor and aroma are found to be markedly enhanced by treatment with the valuable compositions of this invention or with their components individually are: asparagus, broccoli, Brussels sprouts, carrots, cauliflower, creamed corn, whole corn, green beans, lima beans, mixed vegetables, mushrooms, peas, potatoes, spinach, tomatoes, and the like.

For addition to meats, the usual dispensers for dry salt can be used for the compositions and their individual components of this invention. While not necessary, it is sometimes preferred to rub the seasoning compositions into the surface of the meat. Liquid dispensers may also be employed to add solutions of the aforesaid compositions to meat. In treating fresh comminuted meats, the compositions of this invention may be mixed with other seasonings or, alternatively, they may be scattered on the meat before grinding or after the first rough grind. For cured comminuted meats, the compositions or their individual components may be added to the chop with other seasoning components. For cured primal cuts it can be added to the pumping pickle. In the case of breaded products, the compositions are conveniently added to the breading mix. Among the meat products for which a marked enhancement of flavor and odor are obtained by the treatment of this invention are: canned or frozen beef, veal, lamb and pork; pork sausage, liver sausage, frankfurters and bologna; hamburger; hams, bacon, pork shoulder, pork butt; meat loaves and spreads; frozen meat pies; chip steaks, canned meatballs and spaghetti, canned corn beef hash; canned chili, canned stews, canned meat and gravy, canned luncheon meats; and the like.

The compositions of the present invention or their individual components are conveniently applied to poultry by sprinkling into the body cavity of whole birds. If the birds are cooled in an ice bath, it is preferred that the application be made after cooling. It is generally not effective to apply the compositions to the skin. Cut parts can be dusted with the compositions or sprinkled with water solutions thereof. Among the poultry products which exhibit a marked enhancement of flavor and aroma after treatment are: fresh or frozen dressed poultry, canned whole chicken with butter sauce, canned whole chicken with plain broth, canned boned chicken, canned boned turkey, canned chicken fricassee, concentrated chicken broth, canned or frozen chicken a la king, frozen chicken and turkey pies, and the like.

The compositions of the present invention or their individual components may be applied to seafoods together with other seasoning agents or may be applied as a powder or spray. It is preferred that application be made to both sides of fish which should stand 10 to 15 minutes before freezing. Among the seafoods which exhibit a marked enhancement of flavor and aroma after the treatment of the present invention are: canned or frozen fish, fish fillets and steaks, shrimp, scallops, oysters, crab, canned sardines, canned salmon, canned tuna, frozen tuna pies, canned fish pastes, frozen breaded seafood, and the like.

In addition, other food products in which the flavor and aroma are enhanced by treatment with the compositions of the persent invention are: concentrated canned soups, ready-to-serve canned soups, dehydrated soups, cheese crackers, popcorn, potato chips, spice blends, bouillon cubes and pastes, mayonnaise, French and Russian dressings, and the like.

Of course, as has been mentioned hereinbefore, the maltol need not be added to food at the same time that glutamates are added. It may be more convenient in some cases, for example, to add maltol before or after the glutamates.

The following specific examples illustrate the practice of the invention, but are not to be construed as limiting the invention to the foods specifically disclosed.

*Example I*

Various amounts of monosodium glutamate and maltol are added to a commercial concentrated clam chowder. The chowder is diluted with an equal volume of water and is cooked according to the manufacturer's directions. The aroma is determined during the cooking step and after it is cooled to serving temperature the chowder is tasted. The results are tabulated below:

| Monosodium Glutamate, Concentration, Percent of Weight of Concentrated Clam Chowder | Maltol, Concentration, Percent of Monosodium Glutamate | Aroma, Hot | Flavor, Warm |
| --- | --- | --- | --- |
| 0 (control) | 0 (control) | | |
| 0.125 | 0 | No change over control | More succulent than control. |
| 0.125 | 1.7 | Slight increase in body | Do. |
| 0.125 | 2.8 | More body than control | Do. |
| 0.125 | 7.4 | Very pleasing body | Much more succulent than control. |
| 0.125 | 16.7 | do | Very much more succulent than control. |
| 0.125 | 28.4 | Cloyingly sweet | Strong burning sensation. |

Thus it is observed that at levels corresponding to 7.4 and 16.7 percent of the total added monosodium glutamate, maltol induces a much enhanced flavor and aroma to clam chowder.

The procedure is repeated, substituting for the monosodium glutamate an equal weight of monopotassium glutamate; substantially the same results are obtained. The procedure is repeated substituting for the monosodium glutamate an equal weight of monocalcium diglutamate. Substantially the same results are obtained.

*Example II*

To a commercial dehydrated meat and vegetable soup mix is added various amounts of maltol, glutamic acid salts and sodium inosinate. The mixes are reconstituted with water and the soup is prepared according to the manufacturer's directions. The aroma is determined during the cooking step and after the soup is cooled to serving temperature it is tasted. The results are tabulated below:

| Glutamic Acid Salt Concentration, Percent of Weight of Reconstituted Soup | Concentration, Percent of Glutamic Acid Salt | | Aroma, Hot | Flavor, Warm |
|---|---|---|---|---|
| | Maltol | Sodium Inosinate | | |
| Monosodium Glutamate: | | | | |
| 0 (control) | 0 (control) | 0 (control) | | |
| 0.1 | 1.0 | 0 | More meaty than control | Slightly more succulent than control. |
| 0.1 | 10.0 | 0 | Much more meaty than control. | Do. |
| 0.1 | 20.0 | 0 | ----do---- | Do. |
| 0.7 | 1.0 | 0 | More meaty than control | Much more succulent than control. |
| 0.7 | 10.0 | 0 | Much more meaty than control. | Do. |
| 0.7 | 20.0 | 0 | ----do---- | Do. |
| 0.7 | 1.0 | 1.0 | More meaty than control | Slightly more succulent than control. |
| 0.7 | 10.0 | 10.0 | Much more meaty than control. | Much more succulent and "beefy" than control. |
| 0.7 | 20.0 | 20.0 | ----do---- | Do. |
| 0.7 | 25.0 | 25.0 | Cloyingly sweet | Salty; tendency toward burning sensation. |
| 0.7 | 0 | 10 | No change over control | More succulent and "beefy" than control. |
| Monopotassium Glutamate: | | | | |
| 0.7 | 10.0 | 0 | Much more meaty than control. | Much more succulent than control. |
| 0.7 | 10.0 | 10.0 | ----do---- | Much more succulent and "beefy" than control. |
| 0.7 | 10.0 | 25.0 | ----do---- | Tendency toward salty taste. |
| Monocalcium Diglutamate: | | | | |
| 0.7 | 10.0 | 0 | ----do---- | Much more succulent than control. |
| 0.7 | 10.0 | 10.0 | ----do---- | Much more succulent and "beefy" than control. |
| 0.7 | 10.0 | 25.0 | ----do---- | Tendency toward salty taste. |
| 0.7 | 0 | 20.0 | No change over control | Much more succulent and "beefy" than control. |

The procedure is repeated substituting respectively inosinic acid, potassium inosinate and calcium inosinate for sodium inosinate; substantially the same results are obtained.

The addition of maltol in amounts of up to about 20 percent by weight of monosodium, monopotassium and monocalcium glutamate is found to enhance the aroma and taste of the soup. The addition of inosinic acid and the sodium, potassium and calcium salts thereof in amounts of up to about 20 percent by weight of glutamic acid salts is found to increase the natural "beefy" flavor of the soup. This "beefy" flavor is less enhanced in the absence of maltol.

*Example III*

Various amounts of maltol and monosodium glutamate are dissolved in water and added to the gravy in a commercial frozen meat pie filling. The filling is turned into individual pie shells and the pies are baked according to the directions supplied by the manufacturer. While still hot the crusts are cut and the aroma is carefully determined; when cooled to eating temperature, the flavor of the pies are compared by a taste panel. The results are tabulated below:

| Monosodium Glutamate, Concentration, Percent of Weight of Pie Filling | Maltol, Concentration, Percent of Monosodium Glutamate | Aroma, Hot | Flavor, Warm |
|---|---|---|---|
| 0 (control) | 0 (control) | | |
| 0.2 | 0 | No change over control | More succulent than control. |
| 0.2 | 2.4 | Slightly more meaty than control. | Do. |
| 0.2 | 4.75 | More meaty than control | Much more succulent than control. |
| 0.2 | 11.1 | Much more meaty than control. | Do. |
| 0.2 | 21.0 | Somewhat fruity aroma | Slight burning sensation. |

Thus it is seen that 4.75 and 11.1 percent of maltol appreciably increase the succulence and meaty aroma of the food.

The monosodium glutamate concentration is increased from 0.2 percent to 1.0 percent of the pie filling. In the absence of maltol it is observed that the succulence of the product is increased only very slightly and there is no change in the aroma of this product compared to that of the control. In the absence of monosodium glutamate the effect of addition of maltol at corresponding levels of 50, 100, 250 and 500 mg./kg. of pie filling mixture is to provide an enhanced aroma at the two intermediate levels. No appreciable enhancement of the meaty flavor is obtained.

*Example IV*

Various blends of crystalline monosodium glutamate and maltol are made. These are added by means of a shaking type dispenser to the surface of chopped sirloin beef steaks very shortly before the end of a brief broiling period. At the end of the broiling period the steaks are removed to a hot dish and the aroma is determined.

After cooling to serving temperature the steaks are tasted. The results are tabulated below:

| Monosodium Glutamate, Concentration, Percent of Weight of Chopped Sirloin Beef Steak | Maltol, Concentration, Percent of Monosodium Glutamate | Aroma, Hot | Flavor, Warm |
|---|---|---|---|
| 0 (control) | 0 (control) | | |
| 0.05 | 0 | No change over control | Slightly more succulent than control. |
| 0.05 | 0.5 | More meaty than control | More succulent than control. |
| 0.10 | 0.5 | ----do---- | Do. |
| 0.30 | 0.5 | ----do---- | Much more succulent than control. |
| 1.0 | 0.5 | ----do---- | Much more succulent than control; somewhat salty. |
| 0.05 | 10 | Much more meaty than control. | More succulent than control. |
| 0.05 | 20 | Tendency toward sweetness. | Tendency toward burning sensation. |
| 0.2 | 10 | Much more meaty than control. | Much more succulent than control. |
| 0.3 | 10 | ----do---- | Very much more succulent than control. |
| 0.6 | 10 | ----do---- | Do. |
| 1.0 | 10 | ----do---- | Slightly salty. |
| 1.0 | 20 | ----do---- | Do. |
| 1.0 | 21 | Tendency toward sweetness. | Tendency toward burning sensation. |
| 1.0 | 25 | Fruity | Burning sensation. |

The procedure of this example is repeated except that maltol and the glutamic acid salts are added individually to the ground steak mix before it is cooked; substantially the same results are obtained. The procedure is repeated incorporating the glutamic acid salt into the ground meat before cooking and adding the maltol very shortly before the end of the broiling period; substantially the same results are obtained. The procedure is repeated incorporating the maltol in the ground meat before cooking and adding the monosodium glutamate shortly before the end of the broiling period; substantially the same results are obtained.

*Example V*

Fresh shelled green peas are suspended in enough water to cover. To the liquor are added various amounts of monosodium glutamate and maltol. The preparations are allowed to stand for 10 minutes, then are simmered for 15 minutes and the aroma is determined during cooking. The peas are drained and after cooling to serving temperature are tasted. The results are tabulated below:

| Monosodium Glutamate, Concentration, Percent of Weight of Fresh Green Peas | Maltol, Concentration, Percent of Monosodium Glutamate | Aroma, Hot | Flavor, Warm |
|---|---|---|---|
| 0 (control) | 0 (control) | | |
| 0.265 | 0 | No change over control | Slightly brighter than control. |
| 0.265 | 3.64 | Fresh garden odor enhanced | Much brighter, freshly-picked flavor. |
| 0.265 | 8.60 | Somewhat sweeter than control. | Much brighter, fresh-picked flavor. |
| 0.265 | 15.8 | ----do---- | Much brighter, freshly-picked flavor. |

The addition of maltol to peas containing monosodium glutamate is found to markedly increase the freshly-picked natural flavor of the vegetable and to provide a very acceptable increase in aroma.

The procedure is repeated substituting whole kernel corn for the green peas. Substantially the same results are obtained.

The foregoing examples have illustrated the manner in which the flavor and aroma of foods are enhanced by the addition of maltol to foods containing from about 0.05 to about 1.0 percent by weight of glutamic acid salts. This effect has been obtained through use of amounts of maltol from about 0.5 to about 20 percent based on the glutamic acid salts. Outside of the range there was observed an induced sweetness or fruitiness in the aroma and a burning sensation in the taste above the upper limit and no appreciable enhancing effect on either aroma or flavor below the lower limit. In no case within the stated limits was the food altered in an undesirable sense by the treatment.

What is claimed is:

1. A seasoning for food which comprises a mixture of a glutamic acid salt and maltol, said mixture containing maltol in an amount of from about 0.5 to about 20 percent by weight of the said glutamic acid salt.

2. A composition as in claim 1 wherein the said glutamic acid salt is monosodium glutamate.

3. A composition as in claim 1 wherein the said glutamic acid salt is monopotassium glutamate.

4. A composition as in claim 1 wherein the said glutamic acid salt is monocalcium diglutamate.

5. A prepared food containing therein from about 0.05 to about 1 percent of its weight of a glutamic acid salt and maltol in an amount of from about 0.5 to about 20 percent by weight of the said glutamic acid salt.

6. A prepared food as in claim 5 wherein the said glutamic acid salt is monosodium glutamate.

7. A prepared food as in claim 5 wherein the said glutamic acid salt is monopotassium glutamate.

8. A prepared food as in claim 5 wherein the said glutamic acid salt is monocalcium diglutamate.

9. A prepared food as in claim 5 wherein a compound selected from the group consisting of inosinic acid, sodium inosinate, potassium inosinate and calcium inosinate is added in an amount of from about 0.5 to about 20 percent by weight of the said glutamic acid salt.

10. In the method for imparting enhanced flavor to foods by adding thereto a glutamic acid salt, the improvement which comprises adding thereto maltol in the amount of from about 0.5 to about 20 percent by weight of the said glutamic acid salt.

11. A method as in claim 10 wherein the said glutamic acid salt is monosodium glutamate.

12. A method as in claim 10 wherein the said glutamic acid salt is monopotassium glutamate.

13. A method as in claim 10 wherein the said glutamic acid salt is monocalcium diglutamate.

References Cited in the file of this patent

UNITED STATES PATENTS

| | | |
|---|---|---|
| 1,035,591 | Ikeda et al. | Aug. 13, 1912 |
| 2,283,589 | Stuart | May 19, 1942 |
| 2,512,385 | Sabine | June 20, 1950 |
| 2,790,719 | Glickman | Apr. 30, 1957 |
| 2,920,965 | Ziegler et al. | Jan. 12, 1960 |

OTHER REFERENCES

"The Chemical Senses," by Moncrieff, Leonard Hill Limited, 17 Stratford Place, W.L., London, 1944, page 197.

"The Merck Index," sixth edition, published by Merck & Co., Inc., Rahway, N.J., 1952, page 596.